US008392465B2

(12) United States Patent
Bojanic et al.

(10) Patent No.: US 8,392,465 B2
(45) Date of Patent: Mar. 5, 2013

(54) DEPENDENCY GRAPHS FOR MULTIPLE DOMAINS

(75) Inventors: Slobodan M. Bojanic, Redmond, WA (US); Silviu F. Guea, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 238 days.

(21) Appl. No.: 12/775,494

(22) Filed: May 7, 2010

(65) Prior Publication Data

US 2011/0276603 A1 Nov. 10, 2011

(51) Int. Cl.
*G06F 7/00* (2006.01)
*G06F 17/30* (2006.01)

(52) U.S. Cl. .......................... 707/797; 707/798; 707/802

(58) Field of Classification Search .................. 707/798, 707/797
See application file for complete search history.

(56) References Cited

U.S. PATENT DOCUMENTS

| | | | | |
|---|---|---|---|---|
| 5,831,618 A * | 11/1998 | Fuji et al. | ...................... | 715/853 |
| 6,411,936 B1 * | 6/2002 | Sanders | ........................ | 705/7.32 |
| 7,152,157 B2 * | 12/2006 | Murphy et al. | ............... | 713/100 |
| 7,171,623 B2 * | 1/2007 | Hand et al. | .................... | 715/734 |
| 7,373,350 B1 | 5/2008 | Arone et al. | | |
| 7,536,401 B2 * | 5/2009 | Bitonti et al. | .......................... | 1/1 |
| 7,555,555 B2 * | 6/2009 | Park et al. | ..................... | 709/227 |
| 7,725,505 B2 * | 5/2010 | Bonev et al. | .................. | 707/814 |
| 7,975,043 B2 * | 7/2011 | Douglas et al. | ............... | 709/224 |
| 8,024,356 B2 * | 9/2011 | Vienneau et al. | ............. | 707/781 |
| 2005/0015377 A1 | 1/2005 | Wan | | |
| 2005/0071283 A1 * | 3/2005 | Randle et al. | .................... | 705/75 |
| 2005/0125543 A1 * | 6/2005 | Park et al. | ..................... | 709/227 |
| 2006/0264227 A1 * | 11/2006 | Takahashi et al. | ............ | 455/513 |
| 2007/0174426 A1 * | 7/2007 | Swildens et al. | ............... | 709/217 |
| 2007/0199064 A1 * | 8/2007 | Pueblas | ........................... | 726/13 |
| 2008/0222287 A1 | 9/2008 | Bahl et al. | | |
| 2009/0006148 A1 | 1/2009 | Bacalski et al. | | |
| 2009/0150356 A1 * | 6/2009 | Walker | .............................. | 707/3 |
| 2009/0171720 A1 | 7/2009 | Crook et al. | | |
| 2010/0011048 A1 * | 1/2010 | Morris | .......................... | 709/201 |

OTHER PUBLICATIONS

"Metadata-driven Data Integration Ensuring Enterprise-wide Visibility and Transparency with Metadata Management", Retrieved at << http://www.informatica.com/downloads/INFA_meta_WP_6687_web.pdf >>, Jan. 2007, pp. 16.
"SAP® BusinessObjects™ Metadata Management", Retrieved at << http://www.cibernetica.net/imagenes/cibernetica/SAP%20BO%20Metadata%20Management.pdf >>, 2009, pp. 4.
"Data Integrator Management Console: Metadata Reports Guide", Retrieved at << http://help.sap.com/businessobject/product_guides/xir2acc/en/DIMetadataReports.pdf >>, Apr. 26, 2007, pp. 1-74.
"Metadata Component Provider", Retrieved at << http://www.metaintegration.net/ >> on Mar. 17, 2010, pp. 1-4.
"Meta Integration Solutions Through Pictures", Retrieved at http://www.metaintegration.net/Products/Overview/ >>, on Mar. 17, 2010, pp. 1-8.

(Continued)

*Primary Examiner* — Binh V Ho
(74) *Attorney, Agent, or Firm* — Jared S. Goff

(57) ABSTRACT

A first dependency graph representing one or more dependencies in a first computing domain in a computer system can be generated. The first dependency graph can include a reference to an object in a second computing domain that is different from the first computing domain. A second dependency graph can be generated using the reference to the object. The second dependency graph can represent one or more dependencies in the second computing domain in the computer system, and the one or more dependencies represented in the second dependency graph can include one or more dependencies of the object.

20 Claims, 5 Drawing Sheets

OTHER PUBLICATIONS

Friedrich, John R., "Metadata Based Impact and Lineage Analysis Across Heterogeneous Metadata Sources", Retrieved at << http://www.metaintegration.net/Products/News/index.html >>, The 9th Annual Wilshire Meta-Data Conference and the 17th Annual Dama International Symposium, May 25, 2005, pp. 1-55.

Friedrich, John R., "Meta-Data Version and Configuration Management in Multi-Vendor Environments", Retrieved at << http://delivery.acm.org/10.1145/1070000/1066251/p799-friedrich.pdf?key1=1066251&key2=0166160721&coll=GUIDE&dl=GUIDE&CFID=85078295&CFTOKEN=50317049 >>, Proceedings of the 2005 ACM SIGMOD international conference on Management of data 2005, Jun. 14-16, 2005, pp. 799-804.

Bremeau, Christian H., "Metadata Flow in a Multi-Vendor Enterprise Toolset", Retrieved at << http://www.metaintegration.net/Products/News/index.html >>, May 25, 2004, pp. 1-46.

Baragoin, et al., "DB2 Cube Views Getting Started with Meta Integration", Retrieved at << http://www.metaintegration.net/Publications/2003-IBM-DB2CubeViewsRedPaper-MetaIntegration.pdf >>, Sep. 2003, pp. 116.

* cited by examiner

DEPENDENCY GRAPHS FOR MULTIPLE DOMAINS

BACKGROUND

A dependency graph is a data structure that represents dependencies between objects in a computer system, such as in a single computing device or in a network of computing devices. Dependency graphs can be used to represent dependencies between objects that are managed by a particular type of software. For example, a database server may provide a dependency graph that represents dependencies between different database objects, such as different databases, database tables, columns in database tables, etc.

SUMMARY

The tools and techniques described herein are directed to generating dependency graphs for multiple domains. This can be useful, for example, where a dependency graph in a first domain includes a reference to an object in a second domain. In this situation, a second graph can be generated for the second domain, and that second graph can represent dependencies for the referenced object. As used herein, a domain is a portion of a computer system (e.g., server or set of servers in a computer network) that is mapped to a metadata system. Different domains have different metadata systems that have different types of metadata and/or different ways of extracting metadata. For example, Windows Server file servers, SQL Server® database servers, Oracle database servers, and SQL Server® Integration Service (SSIS) data integration subsystems in a computer network may be four different domains in the same computer system.

In one embodiment, the tools and techniques can include generating a first dependency graph representing one or more dependencies in a first computing domain in a computer system. The first dependency graph can include a reference to an object in a second computing domain that is different from the first computing domain. A second dependency graph can be generated using the reference to the object (e.g., by using the reference to locate an appropriate provider module and invoking the provider module to extract the second dependency graph). The second dependency graph can represent one or more dependencies in the second computing domain in the computer system, and the one or more dependencies in the second computing domain can include one or more dependencies of the object (i.e., one or more dependencies on the object and/or one or more dependencies of the object on one or more other objects).

In another embodiment of the tools and techniques, a first dependency graph representing one or more dependencies in a first computing domain in a computer system can be generated. It can be determined whether the first dependency graph includes one or more references to one or more external objects in one or more other domains. If the first dependency graph includes one or more references to one or more external objects in one or more other domains, then one or more dependency graphs for one or more of the external objects from the one or more other domains can be extracted.

In yet another embodiment of the tools and techniques, a first dependency graph representing one or more dependencies in a first computing domain in a computer system can be generated. A reference in the first dependency graph to a dependency on an external object outside the first domain can be identified. Additionally, an extraction provider module that is configured to extract dependency graphs from a second domain can be located. The second domain can include the external object. The provider module can be invoked to extract from the second domain a second dependency graph for the external object.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
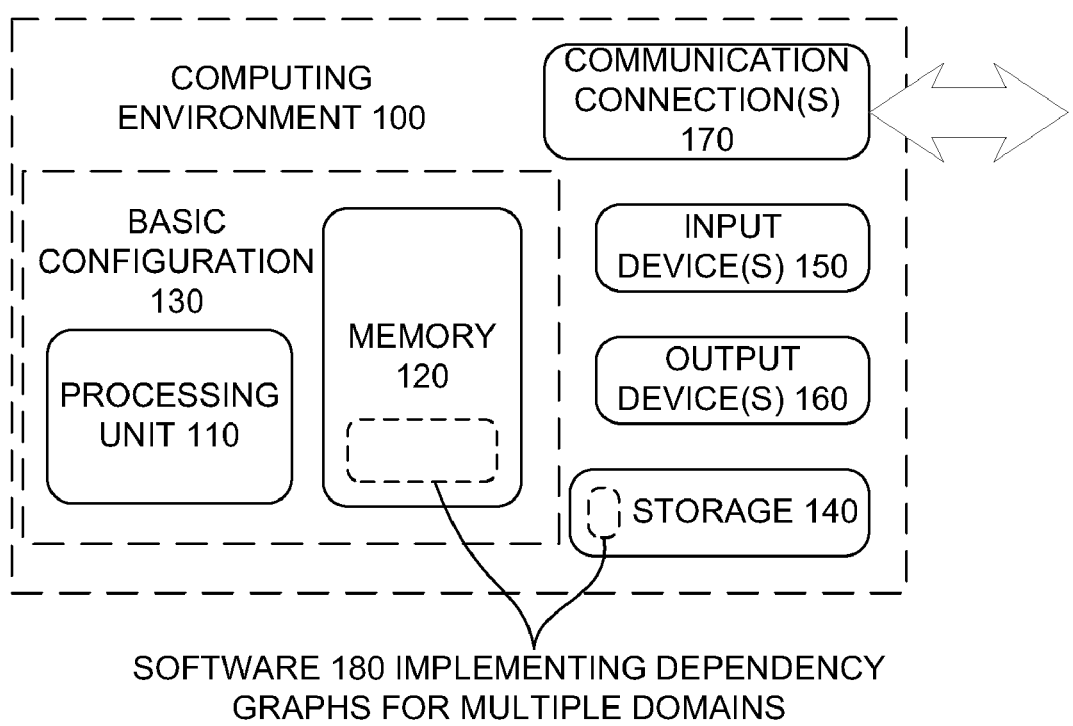
FIG. 1 is a block diagram of a suitable computing environment in which one or more of the described embodiments may be implemented.

Embodiments described herein are directed to techniques and tools for generating dependency graphs for multiple domains. Such improvements may result from the use of various techniques and tools separately or in combination.

Such techniques and tools may include generating a first dependency graph representing one or more dependencies in a computer system. The first dependency graph may include a reference to an external object in a second computing domain that is different from the first computing domain. For example, if the first domain is a SSIS domain, a task from an SSIS package in that domain may depend on a database table from a SQL Server® relational database domain. If the first dependency graph includes such a reference to an external object in a second domain, then a second dependency graph can be generated for the second domain, and that second dependency graph can represent dependencies of that external object. The second dependency graph may or may not represent other dependencies in the second domain. For example, the graph may include only dependencies of a particular database table, or it may include all dependencies in a larger extraction unit (e.g., a file system folder at a particular level).

One or more benefits may be realized from the tools and techniques for generating dependency graphs for multiple domains. For example, database graphs for multiple domains can be generated according to the tools and techniques described herein, and those graphs can be included in a central database storage. Those dependency graphs can be used in representing intra-domain dependencies and inter-domain dependencies. For example, an overall merged graph may be generated for multiple domains. Additionally, indications of the extraction points (e.g., servers) from which the graphs were obtained can be maintained. Accordingly, access to each dependency graph can be limited to user objects that would be allowed to access the extraction point from which the graph came. As used herein, a user object is a computer object that can be granted or denied access permissions. A user object may represent a user, a group of users, an organization, a device, a software module, etc.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as an environment for one or more dependency extractors, provider modules, and/or an extraction points. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing dependency graphs for multiple domains.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Dependency Graph Generation Environment System and Environment

Figure 2:
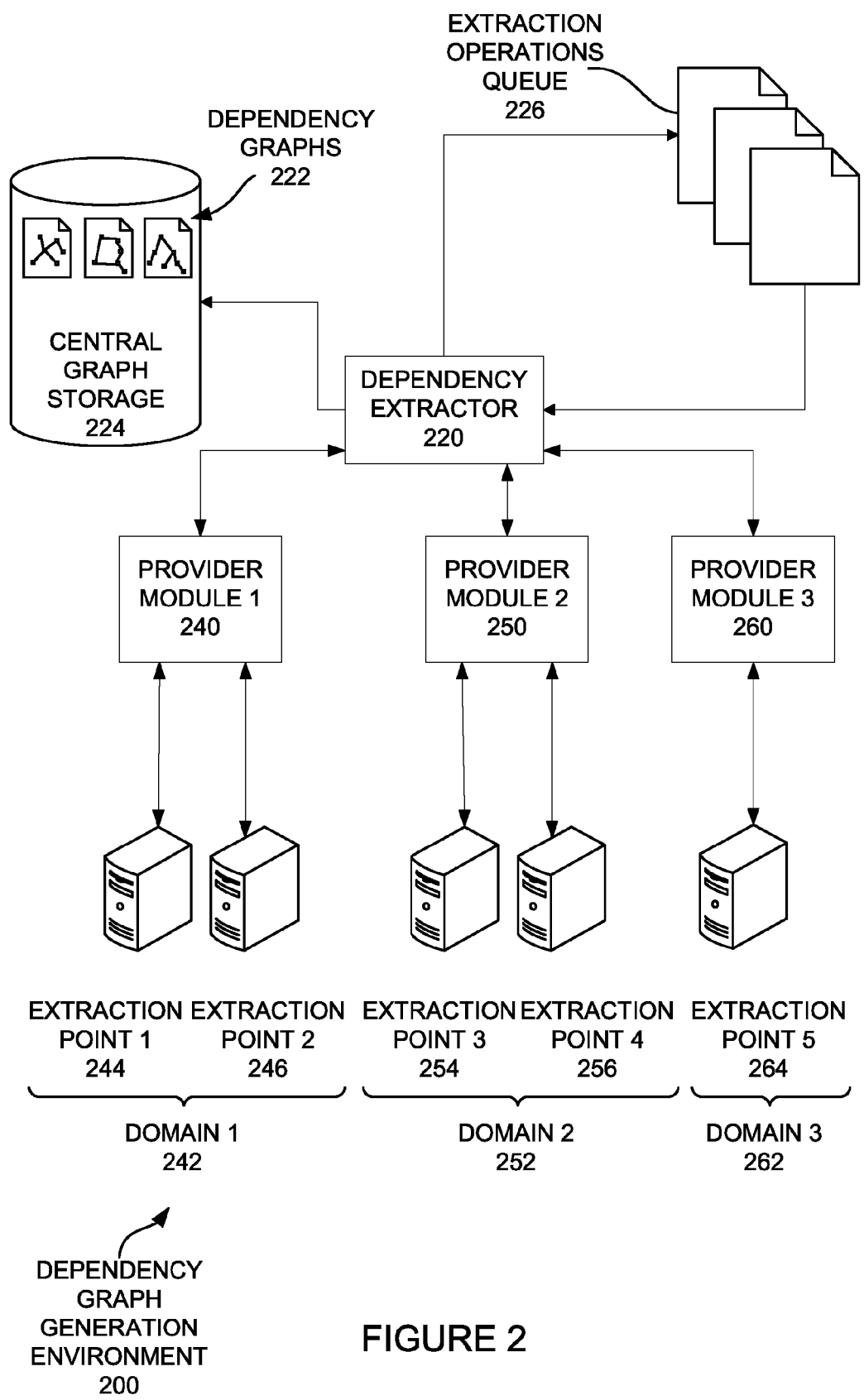
FIG. 2 is a schematic diagram of a dependency graph generation environment.

FIG. 2 is a block diagram of a dependency graph generation system and/or environment (200) in conjunction with which one or more of the described embodiments may be implemented. The environment (200) can include a dependency extractor (220), which can be a module that is configured to manage extraction of dependency graphs (222) and store the graphs (222) in a central graph storage (224), which may be on one or more physical or virtual storage devices. The dependency extractor (220) can manage an extraction operations queue (226). For example, the dependency extractor (220) can include items in the queue (226) to represent extraction operations that still need to be performed. The dependency extractor (220) can load items from the queue and process those items to perform the corresponding extraction operations. The queue may operate in any of various ways, such as by using a first-in-first-out technique, or some other queuing technique.

The dependency extractor (220) can interact with a first provider module (240) to extract dependency graphs from a first domain (242). For example, the first domain may include a first extraction point (244) and a second extraction point (246) that are both Microsoft SQL Server® database servers. The first provider module (240) can be configured to receive requests from the dependency extractor for dependency graphs in the first domain (242) (i.e., the SQL Server® domain in this example, which may include all the SQL Server® database servers in the environment (200)). The first provider module (240) can also be configured to retrieve dependency metadata from the extraction points (244 and 246) in the first domain (242). For example, the first provider module (240) may communicate with the extraction points (244 and 246) in the first domain (242) with network messages, API calls, dedicated connections, etc., as is appropriate for the types of extraction points in the first domain (242). The first provider module (240) can also be configured to generate a dependency graph by translating dependency metadata to a form that can be processed by the dependency extractor (220) (e.g., a form that can be transmitted to the dependency extractor (220) using an application programming interface that is exposed by the dependency extractor (220)).

The dependency extractor (220) can also manage extraction of dependency graphs from other domains. As is illustrated in FIG. 2, the dependency extractor (220) can invoke a second provider module (250) to extract dependency metadata from a second computing domain (252), which can include a third extraction point (254) and a fourth extraction point (256). The dependency extractor (220) can also invoke a third provider module (260) to extract dependency graphs from a third domain (262), which can include a fifth extraction point (264). Of course, the dependency extractor (220) could interact with more or fewer domains and provider modules than are illustrated in FIG. 2.

Techniques for generating dependency graphs from multiple domains will now be discussed in the context of the dependency graph generation environment (200) of FIG. 2. The technique can include the dependency extractor (220) invoking the first provider module (240) to ask extraction points (244 and 246) in the first domain (242) to identify catalog objects to be used as units of extractions. For example, if the first domain (242) is a SQL Server® domain, then the catalog objects may be databases in the first domain (242). As another example, if the first domain (242) is a SSIS data integration subsystem, the catalog objects may be SSIS packages. The first provider module (240) can receive the catalog objects and translate them into representations of extraction operations. Those representations can be passed to the dependency extractor (220) and placed in the extraction operations queue (226). Alternatively, the objects may be passed to the dependency extractor (220), and the dependency extractor (220) may use those objects to generate the representations of extraction operations. The representations can each include a reference to the provider module (here, the first provider module (240)) that can be invoked to perform the extraction of the corresponding dependency graph. Similarly, representations of extraction operations for the second domain (252) may also be included in the extraction operations queue (226).

Once the queue (226) is populated with initial representations of extraction operations, the dependency extractor (220) can fetch each operation representation from the queue (226) and invoke an appropriate provider module to perform the extraction with the scope defined in the extraction operation representation. For example, if the first domain (242) is a SQL Server® domain, the dependency extractor (220) may invoke the first provider module (240) to extract a dependency graph for a specified database from the first extraction point (244).

Each extracted dependency graph can be processed to determine whether external objects from other domains (i.e., domains other than the domain from which the dependency graph was extracted) are included in the graph. For example, a dependency graph extracted from a particular domain (242, 252, or 262) can be parsed by the corresponding provider module (240, 250, or 260) to identify references to external objects that do not belong to the domain for that provider module (240, 250, or 260).

If such external object references are found, they can be used to generate addition extraction operation representations, which can be executed to extract additional dependency graphs, which may reveal new dependencies of those objects in their native domains. For example, a first database table in one database domain may depend on a second database table in a second database domain, and that second database table in the second database domain may in turn depend on a third database table, also in the second database domain. As an example of this, the two domains may be an Oracle database domain and a SQL Server® database domain, and a SQL Server® instance may establish a linked server connection to an Oracle database. A stored procedure (on the SQL Server® side) may use tables from the Oracle and SQL Server® sides and define the dependencies between the first, second, and third database tables discussed above. The dependency of the first table on the third table (via the second table) would not be revealed by dependency graphs that only represent the first database table's native database domain. However, those dependencies may be revealed by another dependency graph extracted from the second database domain that includes the second and third database tables, when that second domain graph is considered along with the first domain graph that includes the second and third database tables.

As an example, when a provider module (240, 250, or 260) identifies a reference to an external object in a dependency graph, the provider module (240, 250, or 260) can mark that reference as an external reference, and can pass the external reference on to the dependency extractor (220). Upon receiving an external reference, the dependency extractor (220) can pass the reference on to other available provider modules (240, 250, or 260), and each of those other provider modules can inform the dependency extractor (220) whether the reference is recognized as being from the domain (242, 252, or 262) of that provider module (240, 250, or 260). For example, if the first provider module (240) is a SQL Server® provider module, then the first provider module (240) can parse connection strings to recognize SQL Server® connections. If a provider module (240, 250, or 260) informs the dependency extractor (220) that it recognizes an external reference as being from its domain, then the dependency extractor can add an operation representation for the external object reference to the extraction operations queue (226), along with an indication that the provider module (240, 250, or 260) can be invoked in performing the extraction operation.

A provider that locates a reference to an external object can generate an object that identifies the external object and includes properties to assist a provider in the object's native domain in extracting dependencies of that object. That new object can be passed to the provider in the object's native domain. For example, during the parsing of an SSIS package by an SSIS provider, the SSIS provider may find a reference to a SQL Server® object (e.g., a table, view, or query). When this happens, the SSIS provider can create a new external object and populate that new external object with properties related to the referenced external object. The new external object can be passed to a SQL Server® provider. The object can be constructed in such a way that the SQL Server® provider that receives the new object can understand that the new object represents a SQL Server® object and can load the properties that were stored inside the new object by the SSIS provider. This can be implemented using various different protocols, such as Uniform Resource Identifier (URI), Resource Description Framework (RDF), or some other standard or in-house protocol implementation.

The original dependency graph that includes the external object reference can be stored in the central graph storage (224) along with other dependency graphs (222). The stored graph can include a superficial reference to the external object in the other domain.

When it is time to retrieve the newly-added operation representation for the external object from the queue (226), that representation can be processed like other operation representations from the queue (226). This can include invoking the provider module (240, 250, or 260) that recognized the external object reference as belonging to its domain. The extracted graph from the external object's native domain (242, 252, or 262) can include a reference to the external object. The reference to the external object in the original graph and the reference to the external object in the graph from the external object's native domain may be used later to join those references as a single node in a common dependency graph. Such a common dependency graph can include both the original dependency graph and the dependency graph from the external object's native domain.

If there is no available extraction point from which a dependency graph can be extracted for a newly scheduled extraction operation representation, that operation representation can be preserved in the queue (226). A common graph composed of the dependency graphs (222) in the central storage may have a missing section in this case. However, this missing section can be identified to a user as a warning of the incompleteness of the common graph. Also, a warning can be issued to a system operator, prompting the system operator to add a connection to the corresponding extraction point. For example, a system operator may provide user input (such as a user name, password, network address, etc.) to allow a provider module (240, 250, or 260) to connect to the extraction point. Missing sections of a common graph may be filled up as connections are established to new extraction points in the environment (200). For example, connections to extraction points can be managed using a subscription registry, which can include connection information for extraction points. The subscription registry may be used to perform scheduled updates of the already-extracted dependency graphs (222), and connection information for new extraction points may be added to the subscription registry.

As the particular extraction point-specific graphs (222) get added to the central graph storage (224), each of those graphs (222) can preserve a link with or reference to the extraction point (244, 246, 254, 256, or 262) from which it came. These links or references can be used to protect access to elements of the aggregated graph, based on the extraction point (244, 246, 254, 256, or 262) from which each element originated. Thus, if a user object would not have access to an extraction point (244, 246, 254, 256, or 262), then that user object can be denied access to dependency graph elements from that extraction point (244, 246, 254, 256, or 262). Accordingly, low-privileged users of the common graph can be denied access to parts of the common graph that represent parts of the environment (200) that are restricted for those users.

While a particular environment (200) has been described above, the techniques and tools described herein may be used in other environments that differ from the environment (200) of FIG. 2. For example, the provider module structure can provide benefits, such as ease of extending the environment (200) to interact with additional domains. However, a central dependency extractor may include functionality to interact with multiple domains in a system without invoking separate provider modules.

III. Techniques for Generating Dependency Graphs for Multiple Domains

Several dependency graph generation techniques will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
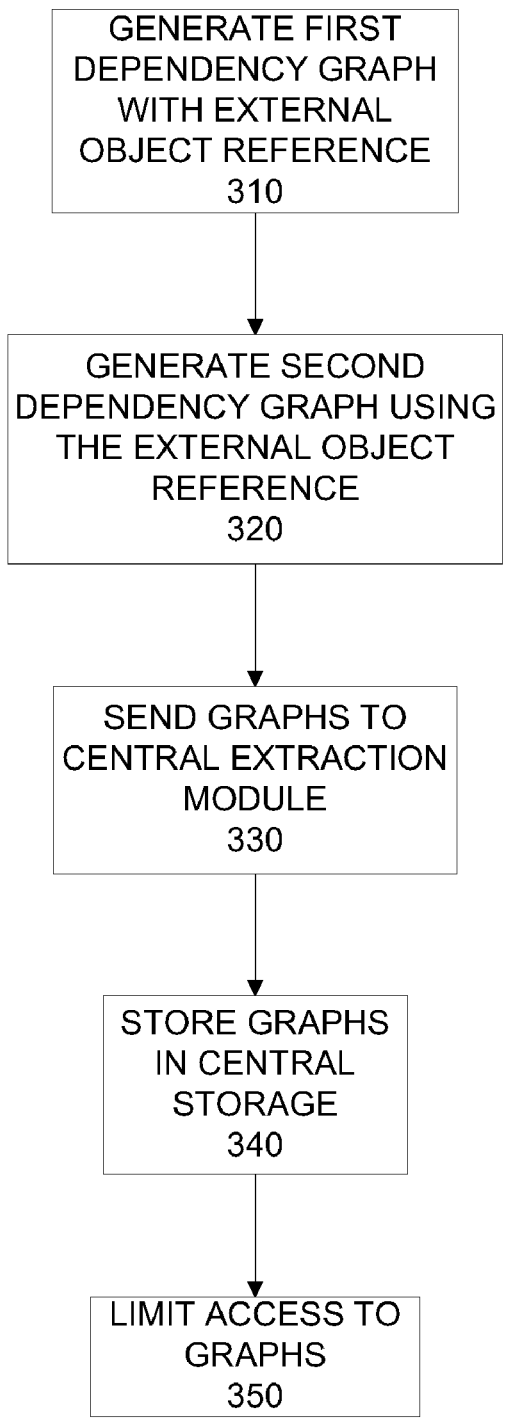
FIG. 3 is a flowchart of a dependency graph generation technique.

Referring to FIG. 3, a dependency graph generation technique will be discussed. The technique can include generating (310) a first dependency graph representing one or more dependencies in a first computing domain in a computer system. The first dependency graph can include a reference to an object in a second computing domain that is different from the first computing domain. The technique can also include generating (320) a second dependency graph using the reference to the object. The second dependency graph can represent one or more dependencies in the second computing domain in the computer system, and those dependencies can include one or more dependencies of the object.

Generating (320) the second dependency graph can include determining that the second domain includes the object, and extracting metadata for the second dependency graph from the second domain. Additionally, generating (310) the first dependency graph can include invoking a first provider module to extract metadata from the first domain, and generating (320) the second dependency graph can include invoking a second provider module to extract metadata from the second domain. Where the object is a first object, the technique can further include passing (directly or indirectly) a second object from the first provider module to the second provider module, where the second object can identify the first object. Moreover, generating (320) the second dependency graph can include determining whether an extraction point for the second dependency graph is available. If the extraction point is available, then generating (320) the second dependency graph can include retrieving metadata for the second dependency graph from the extraction point. If the extraction point is not available, then generating (320) the second dependency graph can include waiting until the extraction point is available to retrieve metadata for the second dependency graph from the execution point.

The technique of FIG. 3 may further include sending (330) the first dependency graph and the second dependency graph to a central dependency extraction module. Additionally, the technique may include storing (340) the first dependency graph and the second dependency graph in a central dependency graph storage.

The first dependency graph can include an indication that the first dependency graph came from a first extraction point in the first domain, and the second dependency graph can include an indication that the second dependency graph came from a second extraction point in the second domain. Moreover, the technique can further comprise limiting (350) access to the first dependency graph to user objects that have access to the first extraction point, and limiting (350) access to the second dependency graph to user objects that have access to the second extraction point.

Figure 4:
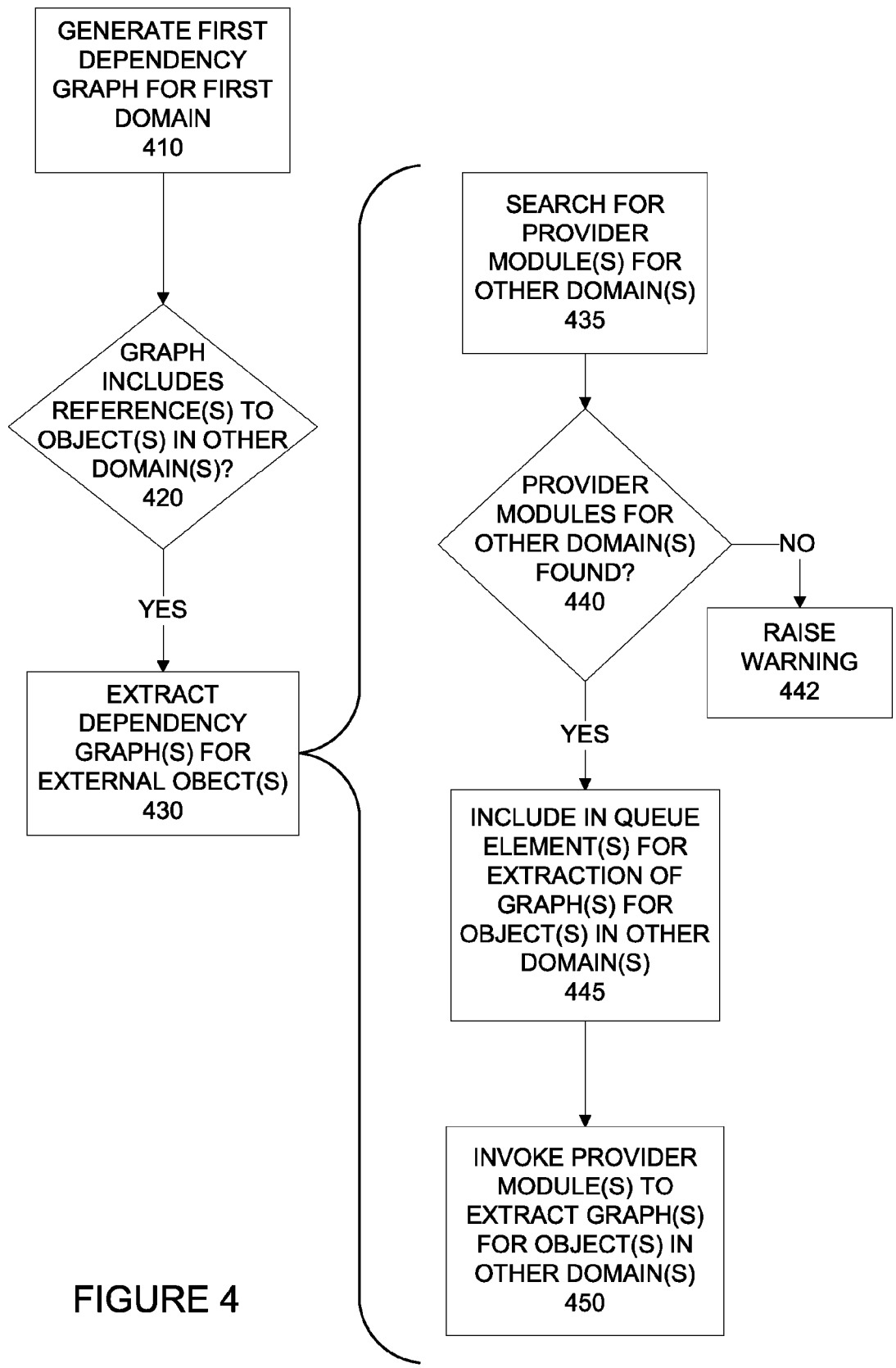
FIG. 4 is a flowchart of another dependency graph generation technique.

Referring to FIG. 4, another dependency graph generation technique will be discussed. The technique of FIG. 4 can include generating (410) a first dependency graph representing one or more dependencies in a first computing domain in a computer system. The technique of FIG. 4 can also include determining (420) whether the first dependency graph includes one or more references to one or more external objects in one or more other domains. If so, then the technique can include extracting (430) one or more dependency graphs for one or more of the external objects from the one or more other domains. Extracting (430) can include searching (435) for one or more provider modules to extract dependency metadata for the one or more other domains. Extracting (430) can also include determining (440) whether one or more matching provider modules for extracting dependency metadata for the one or more other domains have been found. If not (or even if such a provider is only found for some of the external object(s)), then a warning may be raised (442), such by displaying warning that informs a user of potential missing dependencies for the one or more external objects. If one or more matching provider modules for extracting dependency metadata for the one or more other domains is found, then extracting (430) can comprise including (445) in a queue one or more elements for performing one or more extraction operations for extracting one or more dependency graphs for the one or more external objects, and invoking (450) the one or more matching provider modules to extract one or more dependency graphs for one or more of the external objects.

If one or more matching provider modules for extracting dependency metadata for the one or more other domains are found, then the technique may also include storing the first dependency graph and the one or more dependency graphs for the one or more of the external objects in a central dependency graph storage repository. Additionally, if one or more matching provider modules for extracting dependency metadata for the one or more other domains are found, then the technique may include storing one or more indications of one or more domains that are represented by the one or more dependency graphs for the one or more of the external objects. The technique may also include limiting access to the first dependency graph to user objects that have access to an extraction point in the first domain from which the first dependency graph was extracted. Moreover, if one or more matching provider modules for extracting dependency metadata for the one or more other domains is found, then the technique may include limiting access to the one or more dependency graphs for the one or more of the external objects to user objects that have access to the corresponding extraction points in the other domains (i.e., extraction points that include the one or more external objects).

Figure 5:
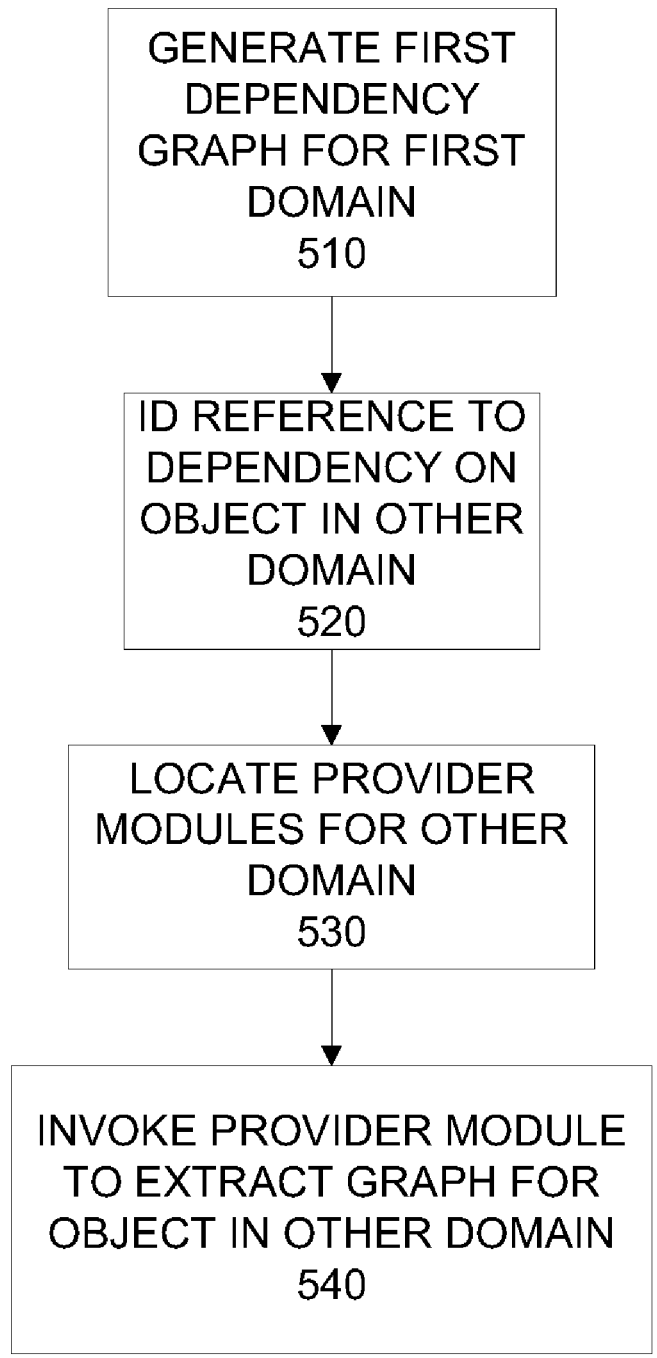
FIG. 5 is a flowchart of yet another dependency graph generation technique.

Referring to FIG. 5, yet another dependency graph generation technique will be discussed. In the technique of FIG. 5, a first dependency graph can be generated (510). The first dependency graph can represent one or more dependencies in a first computing domain in a computer system. The technique can further include identifying (520) a reference in the first dependency graph to a dependency on an external object outside the first domain. The technique can also include locating (530) an extraction provider module that is configured to extract dependency graphs from a second domain, which can include the external object. Moreover, the technique can include invoking (540) the provider module to extract from the second domain a second dependency graph for the external object.

Generating (510) the first dependency graph can include invoking a provider module for extracting the first dependency graph from the first domain. The first dependency graph can include an indication that the first dependency graph came from a first extraction point in the first domain, and the second dependency graph can include an indication that the second dependency graph came from a second extraction point in the second domain. Also, the technique can further include limiting access to the first dependency graph to user objects that have access to the first extraction point, and limiting access to the second dependency graph to user objects that have access to the second extraction point. The acts can also include storing the first dependency graph and the second dependency graph in a central dependency graph storage.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
generating a first dependency graph representing one or more dependencies in a first computing domain in a computer system, the first dependency graph including a reference to an object in a second computing domain that is different from the first computing domain;
generating a second dependency graph using the reference to the object, the second dependency graph representing one or more dependencies in the second computing domain in the computer system, the one or more dependencies in the second computing domain including one or more dependencies of the object;
storing the first dependency graph and the second dependency graph;

limiting access to the first dependency graph to user objects that have access to a first extraction point in the first domain; and limiting access to the second dependency graph to user objects that have access to a second extraction point in the second domain;

wherein generating the second dependency graph comprises determining that the second domain includes the object, and extracting metadata for the second dependency graph from the second domain;

wherein the reference to the object in the first dependency graph is used in generating the second dependency graph;

wherein generating the first dependency graph comprises invoking a first provider module to extract metadata from the first domain; and wherein generating the second dependency graph comprises invoking a second provider module to extract metadata from the second domain.

2. The method of claim 1, wherein storing the first dependency graph and the second dependency graph comprise storing the first dependency graph and the second dependency graph in a central dependency graph storage.

3. The method of claim 1, wherein the object is a first object and the method further comprises passing a second object from the first provider module to the second provider module, the second object identifying the first object.

4. The method of claim 1, further comprising sending the first dependency graph and the second dependency graph to a central dependency extraction module.

5. The method of claim 1, wherein the first dependency graph includes an indication that the first dependency graph came from the first extraction point in the first domain, and the second dependency graph includes an indication that the second dependency graph came from the second extraction point in the second domain.

6. The method of claim 1, wherein generating the second dependency graph comprises:
   determining whether an extraction point for the second dependency graph is available;
   if the extraction point for the second dependency graph is available, then retrieving metadata for the second dependency graph from the extraction point for the second dependency graph; and
if the extraction point for the second dependency graph is not available, then waiting until the extraction point for the second dependency graph is available to retrieve metadata for the second dependency graph from the extraction point for the second dependency graph.

7. Computer-readable storage hardware having computer-executable instructions embodied thereon that, when executed by at least one processor, cause the at least one processor to perform acts comprising:
   generating a first dependency graph representing one or more dependencies in a first computing domain in a computer system, the first dependency graph including a reference to an object in a second computing domain that is different from the first computing domain, the first and second computing domains having different metadata systems; and
   generating a second dependency graph using the reference to the object, the second dependency graph representing one or more dependencies in the second computing domain in the computer system, the one or more dependencies in the second computing domain including one or more dependencies of the object;
   storing the first dependency graph and the second dependency graph;
   limiting access to the first dependency graph to user objects that have access to a first extraction point in the first domain; and
   limiting access to the second dependency graph to user objects that have access to a second extraction point in the second domain;
   wherein generating the second dependency graph comprises determining that the second domain includes the object, and extracting metadata for the second dependency graph from the second domain;
   wherein the reference to the object in the first dependency graph is used in generating the second dependency graph;
   wherein generating the first dependency graph comprises invoking a first provider module to extract metadata from the first domain; and
wherein generating the second dependency graph comprises invoking a second provider module to extract metadata from the second domain.

8. The computer readable storage hardware of claim 7, wherein the different metadata systems comprise different types of metadata.

9. The computer readable storage hardware of claim 7, wherein the different metadata systems comprise different ways of extracting metadata.

10. The computer readable storage hardware of claim 7, wherein the object is a first object and the acts further comprise passing a second object from the first provider module to the second provider module, the second object identifying the first object.

11. The computer readable storage hardware of claim 7, wherein the acts further comprise sending the first dependency graph and the second dependency graph to a central dependency extraction module.

12. The computer readable storage hardware of claim 7, wherein the first dependency graph includes an indication that the first dependency graph came from the first extraction point in the first domain, and the second dependency graph includes an indication that the second dependency graph came from the second extraction point in the second domain.

13. The computer readable storage hardware of claim 7, wherein generating the second dependency graph comprises:
   determining whether an extraction point for the second dependency graph is available;
   if the extraction point for the second dependency graph is available, then retrieving metadata for the second dependency graph from the extraction point for the second dependency graph; and
if the extraction point for the second dependency graph is not available, then waiting until the extraction point for the second dependency graph is available to retrieve metadata for the second dependency graph from the extraction point for the second dependency graph.

14. A computer system comprising:
at least one processor; and
a memory comprising instructions stored thereon that when executed by the at least one processor cause the at least one processor to perform acts comprising:
   generating a first dependency graph representing one or more dependencies in a first computing domain in a computer system, the first dependency graph including a reference to an object in a second computing domain that is different from the first computing domain by having a different metadata system from the first computing domain, generating the first dependency graph comprising invoking a first provider module to extract metadata from the first domain;

generating a second dependency graph using the reference to the object, the second dependency graph representing one or more dependencies in the second computing domain in the computer system, the one or more dependencies in the second computing domain including one or more dependencies of the object, generating the second dependency graph comprising determining that the second domain includes the object and extracting metadata for the second dependency graph from the second domain, and generating the second dependency graph comprising invoking a second provider module to extract metadata from the second domain;

storing the first dependency graph and the second dependency graph;

limiting access to the first dependency graph to user objects that have access to a first extraction point in the first domain; and limiting access to the second dependency graph to user objects that have access to a second extraction point in the second domain.

15. The computer system of claim 14, wherein storing the first dependency graph and the second dependency graph comprise storing the first dependency graph and the second dependency graph in a central dependency graph storage.

16. The computer system of claim 14, wherein the object is a first object and the acts further comprise passing a second object from the first provider module to the second provider module, the second object identifying the first object.

17. The computer system of claim 14, wherein the acts further comprise sending the first dependency graph and the second dependency graph to a central dependency extraction module.

18. The computer system of claim 14, wherein the first dependency graph includes an indication that the first dependency graph came from the first extraction point in the first domain, and the second dependency graph includes an indication that the second dependency graph came from the second extraction point in the second domain.

19. The computer system of claim 14, wherein generating the second dependency graph comprises:

determining whether an extraction point for the second dependency graph is available;

if the extraction point for the second dependency graph is available, then retrieving metadata for the second dependency graph from the extraction point for the second dependency graph; and if the extraction point for the second dependency graph is not available, then waiting until the extraction point for the second dependency graph is available to retrieve metadata for the second dependency graph from the extraction point for the second dependency graph.

20. The computer system of claim 14, wherein the different metadata systems comprise different types of metadata.

* * * * *